United States Patent
Hoang

(10) Patent No.: US 6,295,089 B1
(45) Date of Patent: Sep. 25, 2001

(54) UNSAMPLED HD MPEG VIDEO AND HALF-PEL MOTION COMPENSATION

(75) Inventor: Dzung Hoang, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/281,346

(22) Filed: Mar. 30, 1999

(51) Int. Cl.$^7$ ....................................... H04N 7/18

(52) U.S. Cl. ............... 348/390; 375/240.16; 375/240.18

(58) Field of Search .......... 375/240.13, 240.14, 375/240.18, 240.16, 240.23; 348/443, 447, 449

(56) References Cited

U.S. PATENT DOCUMENTS

| | | |
|---|---|---|
| 5,337,154 | 8/1994 | Dorricott et al. . |
| 5,347,312 | 9/1994 | Saunders et al. . |
| 5,363,146 | 11/1994 | Saunders et al. . |
| 5,384,869 | 1/1995 | Wilkinson et al. . |
| 5,742,343 | 4/1998 | Haskell et al. . |
| 5,825,424 | 10/1998 | Canfield et al. . |

Primary Examiner—Andy Rao
(74) Attorney, Agent, or Firm—Wood, Herron & Evans, L.L.P.

(57) ABSTRACT

A high definition digital video presentation system is provided with an interpolator which upsamples standard resolution MPEG pictures to higher resolution, preferably to double the number of pixels in both the vertical and horizontal dimensions. The upsampling is performed after the decoding and transformation of the incoming picture and prior to the buffering of the picture data or the performance of motion compensation by which pixel data are copied from previously received pictures. In the preferred embodiment, frame pictures are decoded, upsampled and stored in full frame picture buffers, preferably, in two buffers, one to be copied into each field of subsequent pictures in the performance of motion compensation. Interpolation may be by frame, where intervening lines of pixels are interpolated from the pixels of adjacent odd and even lines, and by field, where an intervening odd (or even) line of pixels is interpolated from the pixels of each pair of adjacent even (or odd) lines. With frame interpolation, both buffers are stored with a frame interpolated upsampled picture, while with field interpolation, one buffer is stored with a picture interpolated only from even lines and one is stored with a picture interpolated only from odd lines. The decision to interpolate by frame or by field is made macroblock-by-macroblock by the processor based on an analysis of received data to provide the method that most accurately interpolates the intervening pixels. With the upsampled pictures stored in the buffers, no further half-pel interpolation is required for half-pel motion compensation of new pixels, which is carried out by directly copying original or previously interpolated pixels. Preferably pixels at original pixel positions are, however, interpolated from only original pixel data according to MPEG techniques.

24 Claims, 3 Drawing Sheets

UNSAMPLED HD MPEG VIDEO AND HALF-PEL MOTION COMPENSATION

This application is related to the commonly assigned and copending U.S. patent applications Ser. Nos. 09/001,122 and 09/001,129, both filed Dec. 30, 1997, hereby expressly incorporated by reference herein.

FIELD OF THE INVENTION

The present invention relates to digital video decoding, and more particularly, to systems and methods for decoding MPEG video streams at higher resolution or definition than that at which the video stream was encoded.

BACKGROUND OF THE INVENTION

A standard for digital video and audio programs for broadcast and for recordings such as video compact disks (VCD) has been established by the Motion Pictures Expert Group (MPEG) chartered by the International Organization for Standardization (ISO). Such standards for digital video and two channel stereo audio were established and known as MPEG-1, more formally, as ISO-11172. An enhanced standard, known colloquially as MPEG-2 and more formally as ISO-13818, has been established to provide for enhanced quality and for specifying data formats for broadcast and other higher noise applications as well as digital video disks (DVD) and other higher resolution recorded media.

The MPEG video standard specifies a bitstream syntax that typically provides transformation blocks of 8×8 luminance pels (pixels) and corresponding chrominance data using Discrete Cosine Transform (DCT) coding. The DCT coding is performed on the 8×8 pel blocks followed by quantization, zigzag scan, and variable length coding of runs of zero quantized indices and amplitudes of the indices. Motion compensated prediction is employed. For video, MPEG contemplates Intra (I) frames, Predictive (P) frames and Bidirectionally Predictive (B) frames. The I-frames are independently coded and are the least efficiently coded of the three frame types. P-frames are coded more efficiently than are I-frames and are coded relative to the previously coded I- or P frame. B-frames are coded the most efficiently of the three frame types and are coded relative to both the previous and the next I- or P-frames. The coding order of the frames in an MPEG program is not necessarily the same as the presentation order of the frames. Headers in the bitstream provide information to be used by decoders to properly decode the time and sequence of the frames for the presentation of a moving picture.

The video bitstreams in MPEG systems include a Video Sequence Header containing picture size and aspect ratio data, bit rate limits and other global parameters. Various Sequence Extensions may also be included that contain other information applicable to all pictures of the sequence, including a Progressive Sequence bit which indicates that the sequence contains only Progressive Frame pictures, a Chrominance Format code, original video format (e.g., NTSC, PAL, other) and other variables. Following the Video Sequence Header are coded groups-of-pictures (GOPs). Each GOP usually includes only one I-picture and a variable number of P- and B-pictures. Each GOP also includes a GOP header that contains presentation delay requirements and other data relevant to the entire GOP. Each picture in the GOP includes a Picture Header that contains picture type and display order data and other information relevant to the picture within the picture group.

Each MPEG picture is divided into a plurality of Macroblocks (MBs), not all of which need be transmitted. Each MB is made up of 16×16 luminance pels, or a 2×2 array of four 8×8 transformed blocks of pels. MBs are coded in Slices of consecutive variable length strings of MBs, running left to right across a picture. Slices may begin and end at any intermediate MB position of the picture but must respectively begin or end whenever a left or right margin of the picture is encountered. Each Slice begins with a Slice Header that contains information of the vertical position of the Slice within the picture, information of the quantization scale of the Slice and other information such as that which can be used for fast-forward, fast reverse, resynchronization in the event of transmission error, or other picture presentation purposes.

The Macroblock is the basic unit used for MPEG motion compensation. Each MB contains an MB Header, which, for the first MB of a Slice, contains information of the MB's horizontal position relative to the left edge of the picture, and which, for subsequently transmitted MBs of a Slice, contains an address increment. Not all of the consecutive MBs of a Slice are transmitted with the Slice.

The presentation of MPEG video involves the display of video frames at a rate of, for example, twenty-five or thirty frames per second (depending on the national standard used, PAL or NTSC, for example). Thirty frames per second corresponds to presentation time intervals of approximately 32 milliseconds. The capacity of MPEG signals to carry information is achieved in part by exploiting the concept that there is typically a high degree of correlation between adjacent pictures and by exploiting temporal redundancies in the coding of the signals. Where two consecutive video frames of a program are nearly identical, for example, the communication of the consecutive frames requires, for example, only the transmission of one I-picture along with the transmission of a P-picture containing only the information that differs from the I-picture, or Reference Picture, along with information needed by the decoder at the receiver to reconstruct the P-picture from the previous I-picture. This means that the decoder must have provision for storage of the Reference Picture data.

Information contained in a P-picture transmission includes blocks of video data not contained in a Reference I- or P-picture, as well as data information needed to copy data into the current picture from a previously transmitted I- or P-picture. The technique used in MPEG systems to accomplish P-picture construction from a Reference picture is the technique of Forward Prediction in which a Prediction in the form of a Prediction Motion Vector (MV) is transmitted in lieu of the video data of a given or Target MB. The MV tells the decoder where and how to extract a 16×16 block of pixel data from the I- or P-Reference Picture to be reproduced as the Target MB. If needed, a Prediction Error is transmitted in the form of an error block that contains pixel data needed to supplement the copied motion compensated data in order to complete the current picture.

With B-pictures, the Bidirectional Temporal Prediction technique called Motion Compensated Interpolation is used. Motion Compensated Interpolation is accomplished by transmitting, in lieu of all of the video data for a Target MB, an MV that specifies which 16×16 block of pixels to copy either from the previous Reference Picture or from the next future Reference Picture, or from the average of one 16×16 block of pixels from each of the previous and next future Reference Pictures. By "previous" reference picture is meant a reference I- or P-picture that has already been displayed. By "future" reference picture is meant a reference P-picture that has yet to be displayed, but has been received before the current picture to permit the copying of data from it. With the motion vector, an Error Block of only the data, if any, that cannot be supplied by copying from the reference pictures is transmitted in pixel data form.

Motion compensation vectors in current MPEG P- and B-pictures specify relocation of pixel data to the nearest half pel. This requires that the MPEG decoders perform a half-pel interpolation of luminance and chrominance values from adjacent pixel data in a 16×16 sized block copied from the reference picture in order to arrive at the luminance and chrominance values for the pixels of the macroblock in the current picture. Typical MPEG video decoders carry out this half-pel interpolation upon the performance of the motion compensation as the current picture is being written to the output buffer. With standard resolution systems, the output macroblocks will have the same number of pixels as the reference macroblocks, so that after the half-pel interpolation, the original copied pixel values will be discarded. The resolution of the resulting current picture typically approaches that of the reference picture, but which may be a slightly degraded reproduction of the original picture. The addition of half-pel interpolation to motion compensation of video programs enhances the quality of the output when presented in the original resolution.

Many programs, broadcast and recorded, are or will be of standard DVD resolution. As HDTV systems are developed and deployed, there will be a substantial period of time during which such HDTV systems will be used to present programs transmitted or recorded in DVD resolution. Such presentations must multiply, typically double, the number of lines of the output pictures and multiply the number of pixels per line in order to fill the high resolution display. For example, the the increasing of the resolution may involve the duplication of pixel data of the video program to enlarge the 8×8 pixel video blocks to 16×16 pixel blocks that are sent to the display, sending four copies of each pixel in a 2×2 block to the display. With such a technique, the resolution of the output picture would be presented with, for example, four times as many pixels as the original data, but the resolution would not be generally improved.

There is a need in cases where video presentation systems have resolution capabilities greater than the resolution of incoming programs, including cases where half-pel interpolation is employed, to improve the resolution of the presented program to greater than that in which the program was encoded.

SUMMARY OF THE INVENTION

A primary objective of the present invention is to provide a video decoding system and method by which video programs can be presented with enhanced resolution, particularly with resolutions that are greater than that at which the incoming video stream was encoded. It is a particular objective of the present invention to provide a system and method for efficiently and effectively presenting a video program, particularly an MPEG video program, that has been broadcast or recorded in a lower or standard resolution as a higher definition video program output.

It is a further objective of the present invention to provide a video system and method by which can be more effectively achieved half-pel interpolation such as that which accompanies motion compensation used, for example, in MPEG programming.

In accordance with the principles of the present invention, there is provided a system and a method by which video pictures are decoded, the decoded video pictures are upsampled by interpolating additional pixels between the pixels of the decoded picture to produce frame picture data at higher resolution than that of the decoded picture, and the upsampled pictures are stored. When subsequent pictures are called for by the received video signal, pixel data to be copied from previously received pictures is copied from the upsampled pictures that have been stored. Where such copied pixel data are moved by a motion vector from a location that lies between adjacent pixels of the original decoded picture, such as in half-pel interpolation, the intermediate interpolated pixels are directly copied without further interpolation, at least for data being copied to new pixel locations created by the upsampling process. Such copied picture data are either stored in a full frame picture buffer in memory, from which the data are to be copied in the construction of future pictures, or are sent to an output buffer or output directly as a frame or field.

In the preferred embodiment of the invention, the incoming signal is in the form of an MPEG video bitstream. Reference frame buffers are provided of sufficient size to store full frame pictures from the video input signals that have been decoded and upsampled to include two or four times as many pixels in the vertical direction, and preferably also about twice as many pixels in the horizontal direction. These upsampled pictures, which may be, for example, I and P full frame MPEG pictures, are stored in the full frame buffers. In addition, when MPEG B-pictures are received, such data are also similarly upsampled and either stored in an output buffer memory or in SRAM on the processor, and output to a video presentation device in high resolution. P- and B-pictures also typically contain motion vector data and error block data. The upsampling and interpolation of additional pixels between those of an incoming P- or B-picture are performed whether or not half-pel interpolation is required by motion vectors of the received data. As a result, each 16×16 macroblock of the original low resolution picture is converted to, for example, a 32×32 pixel image of the original macroblock in the reference picture buffers and on the display.

Preferably, the system has all of the capabilities necessary to receive, decode and present a high definition television or video disc program, and is provided with buffer memories of sufficient size to buffer such high definition pictures. From information in the higher level headers in the incoming bitstream, the processor of the system determines which programs are of such high definition and which are not. When a lower definition program that has, for example, half of the lines and half of the pixels per line of the pictures that the system is capable of displaying, then the upsampling is carried out to present the lower definition picture at the higher definition which the system is capable of presenting. The interpolation concept may be used with systems capable of producing resolution similarly higher than the definition of the original incoming picture.

The interpolation may be carried out on a frame basis, referred to herein as "frame interpolation", by which received pixel data from adjacent lines, which include one even or top-field line and one odd or bottom-field line, are input to an interpolation filter for the interpolation of intervening pixels. Frame interpolation may also be referred to as "inter-field" interpolation in that it averages or otherwise derives new pixel data from pixel data from both fields of a frame picture. The interpolation may also be carried out on a field basis, referred to herein as "field interpolation", by which received pixel data from only the same field, or either adjacent odd lines or adjacent even lines only, are input to the interpolation filter for the interpolation of the intervening pixels. Field interpolation may also be referred to as "intra-field" interpolation in that it averages or otherwise derives new pixel data from data from only one field of a picture. With field interpolation, where it is necessary to include data for pixels of the lines of the opposite field, this pixel data are also interpolated from the data of the current field.

Field interpolation may be performed on data from a field of a frame picture, in which case the data are read only from alternate lines of the frame picture, ignoring the data from the lines of the other field. Field interpolation may also be performed on data from a field picture or a field DCT portion a frame picture, in which cases the lines from the other field are absent and the lines of the same field are adjacent. In field interpolation, the interpolation of intervening pixels preferably includes the replacement by interpolation of pixels of the lines of the opposite field as well as the creation by interpolation of pixel data for new intervening lines of additional pixels between lines of the opposite fields of an upsampled frame picture.

In the preferred embodiment of the invention, frame interpolation results in a multiplication by 2 of the lines of data in the vertical dimension to produce an upsampled full-frame picture. Field interpolation also produces a full frame upsampled picture but from the lines of a single field, by multiplication by 4 of the lines of data in the vertical dimension. In both frame interpolation and field interpolation, the number of pixels in each line is preferably multiplied by 2.

It can also be said that interpolation, whether frame interpolation or field interpolation, produces a more accurate estimation of the new intervening pixels when the data that is input to the interpolation filter is temporally simultaneous data. Frame interpolation considers pixels from the lines of both fields as if they were simultaneous. If the data from both fields is simultaneous, frame interpolation produces a more accurate estimate of intervening pixels because it inputs twice as many pixels of data. On the other hand, if the two fields are displaced in time, motion might exist in the time interval between the two fields. If the data are so displaced in time and motion is present in the time interval between the fields, frame interpolation of the data can introduce error due to the motion by averaging pixels from both fields, and therefore be less accurate than field interpolation, which has no motion among the pixels of the single field. With field interpolation, the data input to the filter includes only half as many pixels as with frame interpolation, and the input pixel data are therefore twice as far apart. Therefore, frame interpolation is capable of greater spatial accuracy but is vulnerable to inter-field motion error. As a result, frame interpolation is preferred where there is no or little motion between fields, while field interpolation is better where there is greater motion between fields. The preferred embodiments of the present invention select the form of interpolation that produces the better picture reproduction, given the data being received, and preferably on a macroblock by macroblock basis.

In the preferred embodiment of the invention, either frame interpolation or field interpolation is selected based on information in the incoming video signal, and the selection may vary from picture to picture or from one portion of a picture to another, depending on the content of the incoming signal. In some cases, the information may be information in a stream header designating the picture or may be derived from the video picture data itself. The selection is preferably made on a macroblock by macroblock basis. The selection is preferably made so that the form of interpolation, frame or field, is that which will result, or is more likely to result, in the most accurate or most acceptable reproduction of the encoded video picture.

In the preferred apparatus of the invention, two separate areas are provided in the frame buffer for storage of the upsampled frame pictures. One may, for example, be used to copy data for subsequent top fields while the other may, for example, be used to copy data for subsequent bottom fields. With frame data, the same frame picture may be used to copy data to either top or bottom fields of future pictures. With field interpolation, the frame data in the two parts of the buffer differ with one being derived from only top field data and the other being derived from only bottom field data. Where frame interpolation is used, separate copies of the frame picture are stored in each of the two parts of the memory, where they will be treated as corresponding to separate fields. This is particularly helpful where the interpolation method may vary on a macroblock-by-macroblock basis throughout a picture. However, where entire pictures are frame interpolated, instead of storing two identical copies, one copy can be stored and logic provided to direct future copying of data from the memory for either field of a future picture. The separate storage of frame interpolated pictures accommodates cases where motion compensation is applied to each on a field basis. Predictive or P-pictures may be motion compensated and will be stored in the frame buffers as reference pictures for future pictures.

In the preferred embodiment of the invention, those pixels of MPEG program pictures that are located in the positions of the picture that would be occupied by original pixel data are processed in such a way as to be identical to the pixel data that would result by processing according to MPEG. This assures full MPEG compatibility and compliance. To achieve this result, motion compensation is performed as described above to produce the data for pels newly created by the upsampling, including where motion compensation is by half pel vectors. For the pixels occupying original positions, data that is copied directly from other original positions is directly reproduced, but data copied from half pel positions is replaced by data interpolated from nearby original pixel position so as to produce the same interpolated data that would be produced according to standard MPEG techniques had the picture been processed without upsampling according to the present invention.

Various information from the incoming signal may be used for selection of the better method, frame interpolation or field interpolation, to be employed. For example, if a header indicates that the video signal contains progressive frame pictures, which is indicated by a flag in a header, frame interpolation is preferably used. Where the signal indicates that the data are DCT encoded by field, or is only a single field picture, then field interpolation is usually required, since only data from one field is available.

Where the picture is DCT encoded by frame, that is where all lines of the video picture (or at least of the macroblock being processed) are arranged in interleaved form and encoded together, more sophisticated criteria are preferably used. With frame DCT encoding, if the values of the motion vectors are zero or nearly zero, indicating that there is virtually no motion, frame interpolation is preferred. With frame DCT encoding and the motion compensation performed on a frame basis rather than separately for each field, the energy in the error blocks of motion compensated pictures is preferably evaluated. If the energy is low, it is probable that the frame based motion compensation is accurately reproducing the picture, so it is likely that interpolation on a frame basis will also more accurately describe the intervening pixels, so frame interpolation is preferred. On the other hand, if the energy in the error blocks is high, it indicates that frame based motion compensation is not accurately reproducing the picture, so that field interpolation is more likely to be more accurate and is preferred. The use of the energy in error blocks may be used in other situations to determine when one form of interpolation will be better than the other.

Further, where the picture is frame DCT encoded but motion compensation is being carried out by field, normally field interpolation will be more accurate and is preferred. However, consideration of the energy in the error blocks may be used to make or confirm a decision on the form of interpolation more suitable for such a case. In another situation known as dual-prime motion compensation, that is, where the picture is DCT encoded by frame with a single motion vector and a differential motion vector being applied to both fields of a target picture from both fields of a reference picture, field interpolation is preferred. Dual prime motion compensation is used where the amount of motion may be high but the motion from field to field is generally constant.

The present invention provides a video decoding system and method capable of producing substantially more spatial detail in upscaled video presentations than is provided by simply scaling video frames after decoding with a standard video decoder. The invention in its preferred embodiments provides a receiver with the intelligence to effectively upscale pictures that are encoded in a variety of ways, and to do so on a macroblock-by-macroblock basis. The invention does so while fully and efficiently supporting MPEG-2 half-pel motion compensation of pictures encoded in a large variety of methods.

By increasing resolution according to the present invention, original picture data that would be discarded by MPEG in the course of half-pel interpolation is retained and incorporated into the upsampled output picture. This provides more accurate upsampled reproduction of the pictures than prior art MPEG methods, which, having discarded some original pixel data in MPEG half-pel interpolation, must further interpolate replacement data from already interpolated data. As a result, the upsampled high resolution images are truer copies of the original picture than a standard resolution image reproduced by MPEG techniques where the data has been half-pel motion compensated.

Additionally, the present invention provides full upsampled frames of data from which each field to be output by interlaced display can be made up of data from only alternate lines. As a result, a video presentation device capable of displaying full progressive frames at, for example, 1/60th second intervals can do so by display of the full frame upsampled picture representations of each of the fields.

These and other objectives and advantages of the present invention will be more readily apparent from the following detailed description of the preferred embodiments of the invention, in which:

DETAILED DESCRIPTION OF THE PREFERRED EMBODIMENTS

Figure 1:
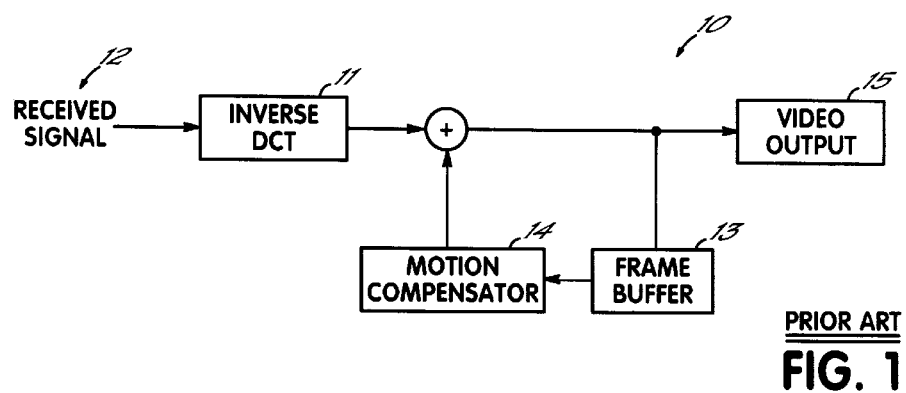
FIG. 1 is a block diagram representing an MPEG receiver of the prior art.

A prior art video decoding portion of an MPEG receiver system 10, such as is embodied in a digital television system or digital video disc player (DVD) for example, is represented by the block diagram of FIG. 1. Such a system 10 includes a decoding and transformation section 11 at which a received signal 12 in the form of a digital video bitstream is decompressed and transformed by a discrete Fourier transform into MPEG pixel data. I-picture data, when received and decoded, are stored directly in a frame buffer 13. P-picture data, when received and decoded, are combined with data of a previously stored picture from the frame buffer 13 that have been processed by a motion compensation section 14 of the video decoder 33 and stored back into the frame buffer 13. B-picture data, when received and decoded, are combined with data of previously stored I- or P-pictures from the frame buffer 13 that have been processed by the motion compensation section 14 of the video decoder 33. The B-picture data are either stored in an output buffer or sent directly to a video output 15 and to a video presentation device.

Motion compensation in MPEG processing involves the decoding of motion vectors which specify from where in previously received and stored reference pictures, for example I- or P-pictures that have been stored in the frame buffer 13, data must be copied. In systems of the prior art, when motion vectors extracted from the incoming data of a B-picture or a P-picture call for copying of data that is to be relocated to the nearest half-pel, that is, which may have to be copied from midway between pels of a reference picture, rather than from an original pel, half-pel interpolation of the picture data retrieved from between pels in the frame buffer 13 is made in the motion compensation section 14, and the original copied data are discarded, leaving a block of video data of the same resolution as the original picture but made up of the interpolated data only.

Figure 2:
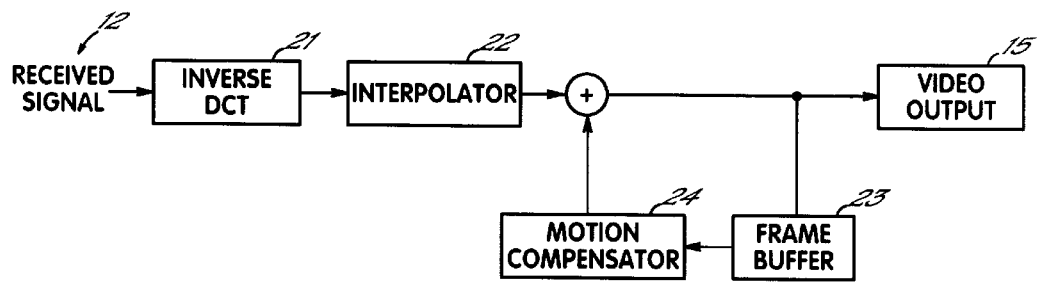
FIG. 2 is a block diagram similar to FIG. 1 representing a receiver embodying principles of the present invention.

A video decoding portion of an MPEG receiver system 20, according to principles of the present invention, is represented by the block diagram of FIG. 2. Such a system 20 includes a decoding and transformation section 21, which may be the same as the section 11 of the system 10 of FIG. 1, at which received signal 12 is decompressed and transformed. The video decoding portion of the MPEG receiver system 20, however, includes a half-pel interpolator or upsampler 22, connected to the output of the decompression and transformation section 21, which upsamples all incoming pixel data whether or not half-pel motion compensation is indicated by motion vectors. The interpolator 22 upsamples the picture data of the decompressed and transformed signal vertically and preferably also horizontally by using one of several possible half-pel interpolation techniques to include lines of pixels between each of the lines of pixels of the received picture, and preferably also adds pixels between each of the columns of pixels of the horizontal lines.

Figure 3:
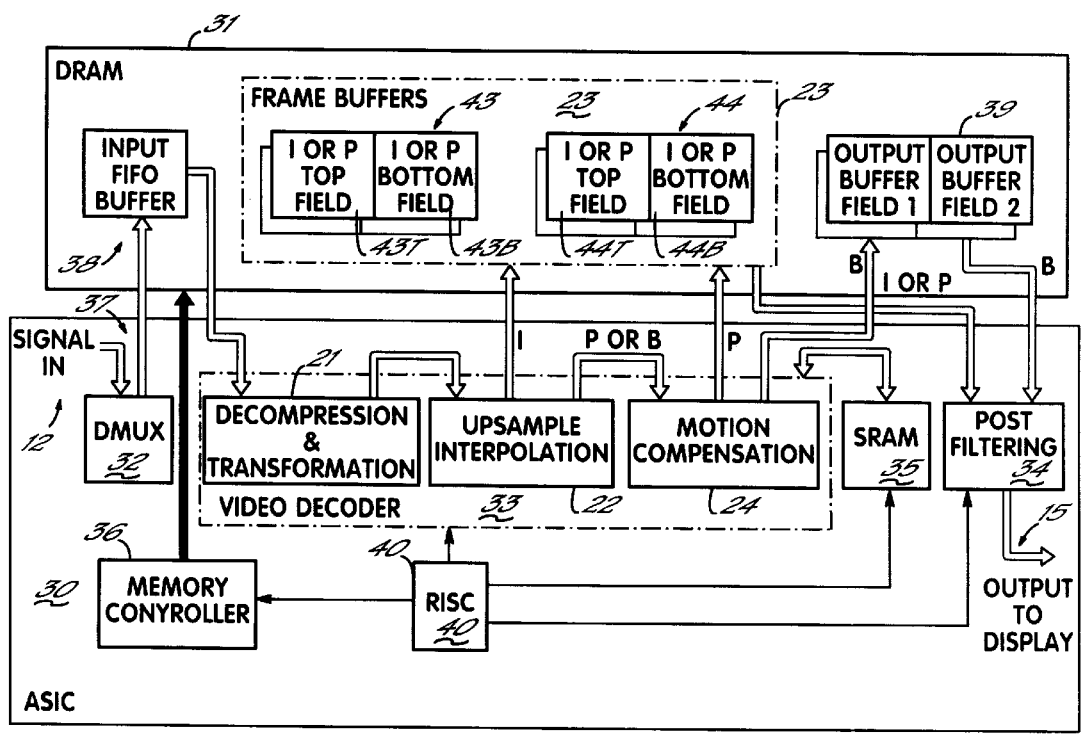
FIG. 3 is a more detailed block diagram of the subject matter depicted in FIG. 2.

With I-pictures, the upsampled picture data are stored in the system 20 directly in one or more frame areas of a frame buffer 23. The frame buffer 23 includes two full frame picture storage areas 43 and 44, as illustrated in FIG. 3. The I-picture data, when received, can be stored in either area, and replaces a previously stored I-picture or P-picture in one of the areas 43,44 on a first-in/first-out basis.

P-picture data, when received and decoded, is also upsampled in the interpolator 22. The upsampled P-picture data are combined with data copied from the most recently previously stored I-picture or P-picture in one of the storage areas 43,44 of the frame buffer 23, according to the new picture's motion vectors in the motion compensation section 24 of the decoder 33.

In the upsampling of P-pictures, error blocks, which contain the pixel data that has not been accurately provided by motion compensated copying from previously stored frames in the buffer 23, are also upsampled and half-pel interpolated, taking the place of portions of the copied data. Motion compensated copying of the data from the reference pictures in the buffer 23 is carried out by directly copying from interpolated rows in the upsampled and previously stored data in the frame buffer 23 without the need for further half-pel interpolation in the motion compensation section 24. The upsampled error block data are combined with the motion compensated data with no subsequent half-pel interpolation being required. The current P-picture so produced is then stored in the area 43 or 44 of the frame buffer 23, usually the area opposite the area 43,44 from which the data was copied, replacing the older of the previously stored reference pictures.

Similarly, the error blocks of B-picture data, when received and decoded, are also upsampled in the same way in interpolator 22 and then combined with motion compensated data averaged from two previously stored reference pictures from the frame buffer 23 that have been processed by the motion compensation section 24 of the decoder. The B-picture data are then either stored in an output buffer or sent directly to a video output 15 and on to a video presentation device. Additional details of motion vector and error block processing as well as additional concepts of compressing and decompressing decoded picture data respectively to and from the buffer 23 are set forth in the commonly assigned U.S. patent application Ser. No. 09/178,960 filed on Oct. 26, 1998 by the inventor hereof, hereby expressly incorporated by reference herein, which is compatible with the features of the present invention.

In the video decoding portion of an MPEG receiver system 20, according to a preferred embodiment of the present invention, as represented by the block diagram of FIG. 3, the system 20 includes an application specific integrated circuit (ASIC) 30, an off chip buffer memory 31, and other components not relevant to the present invention. The ASIC 30 contains a DMUX 32 having an input to which the received input signal that contains the video bitstream is applied, a video decoder portion 33 which contains the decompression and transformation section 21, the interpolator 22, the motion compensation section 24, a post-filtering section 34 which connects to the output 15 to which the video presentation system is connected, on-chip static memory (SRAM) 35 (shown as a block but typically distributed throughout the ASIC 30), a memory controller 36, a data bus 37 (represented by the white filled arrows) and a Reduced Instruction Set Controller (RISC) 40, which serves as the local CPU of the ASIC 30, and other circuits. The buffer memory 31 provides off-chip storage for picture data, and includes the frame buffers 23, an input FIFO buffer 38 and an output buffer 39. Each of the buffers 23 and 39 includes two parts, one part for storing pixel luminance values and one part for storing pixel chrominance values. This is illustrated by depicting the buffers 23 and 39 as two layers in FIG. 3.

As explained above, MPEG pictures are presented in the form of N horizontal scan lines of pixels that are displayed, according to the NTSC standard used in the United States and Japan, for example, at 30 frames per second. Each such frame is displayed in two fields $\frac{1}{60}$th of a second apart. The first field is the top field which contains the even scan lines 0, 2, ..., N−2, while the second field is the bottom field which contains the odd scan lines 1, 3, ..., N−1. For standard resolution NTSC video, for example, the number of visible scan lines N equals 480 lines for conventional format, 360 for letterbox format, of 720 pixels per line. Under the PAL standard used in Europe, the number of visible lines N is 576 for standard format, 432 for letterbox format, also at 720 pixels per line.

Figure 4:
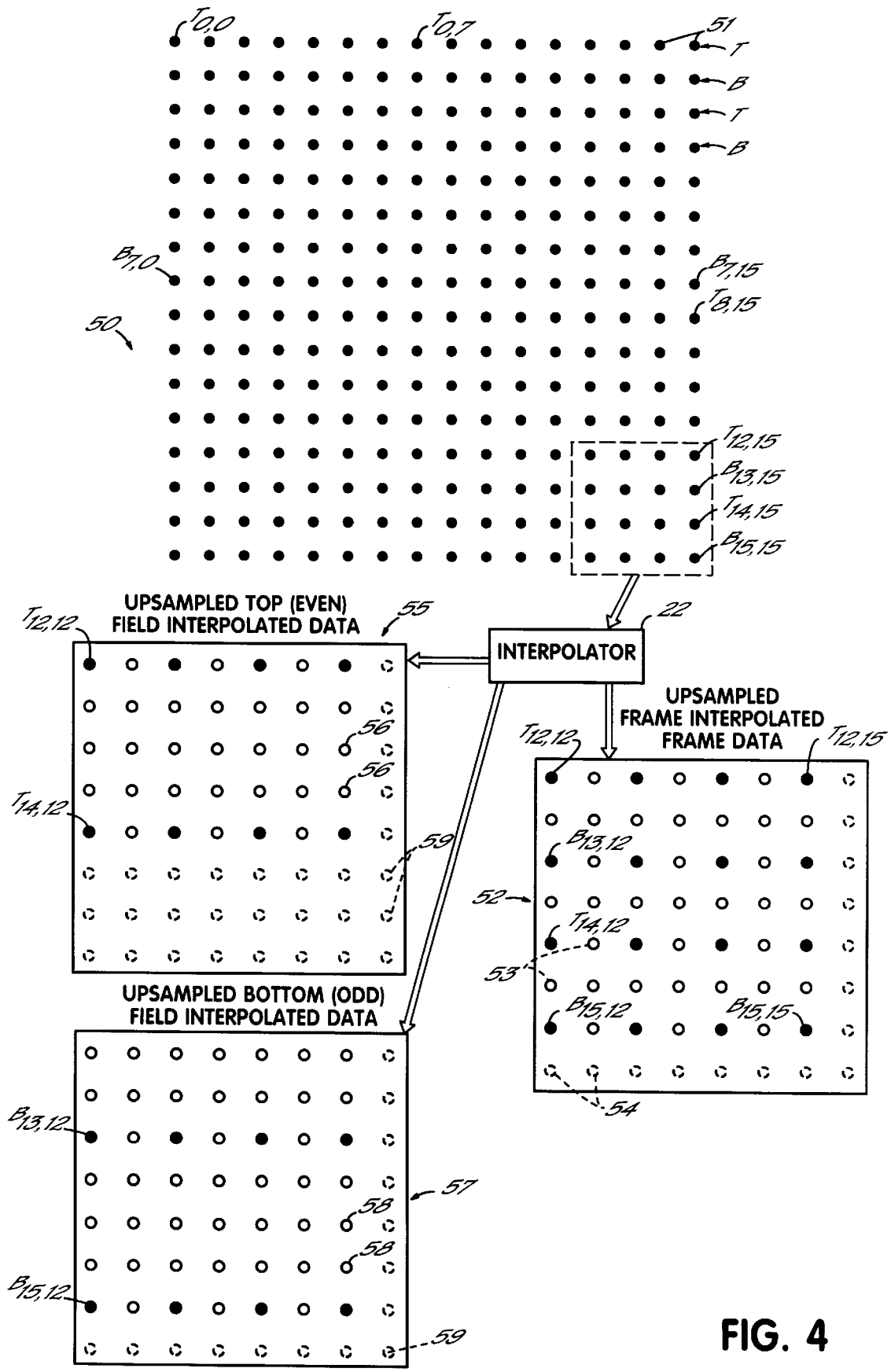
FIG. 4 is a diagrammatic representation of the pixels of a macroblock of a received video program illustrating the upsampling by frame and field interpolation performed by certain embodiments of the system of FIGS. 2 and 3.

As represented in FIG. 4, the pixel data of a frame picture of MPEG video are encoded in macroblocks 50 containing square arrays of 16×16 pixels 51. The luminance or brightness data and color or chrominance data of the pixels 51 of the macroblocks 50 are separately encoded, with the representation in FIG. 4 thereby being applicable to luminance data and to chrominance data in the 4:4:4 chrominance format. (In 4:2:2 and 4:2:0 chrominance formats, chrominance data values each correspond to multiple luminance pixels, in which case the illustrated array for the chrominance data corresponds to the correspondingly smaller chrominance block size). In FIG. 4, the macroblocks 50 may be considered made up of even lines T of the top field, including lines 0, 2, ... 14, and odd lines B of the bottom field, including lines 1, 3, ..., 15. Each line may be considered made up of pixels 0 through 15. Specific individual pixels belonging to the top field of a macroblock are labeled $T_{line,pixel}$ while those belonging to the bottom field of the macroblock are labeled $B_{line,pixel}$. Each of the pixels is marked with a solid dot designating original data as decoded from the incoming bitstream by the MPEG process. The macroblock 50 is representative of I-picture data or error block data of a P- or B-frame picture.

In the incoming signal 12, the video data are input in slices of horizontally consecutive macroblocks, which are decoded on a macroblock by macroblock basis to produce the decoded 16×16 array of pixels as illustrated by macroblock 50 in FIG. 4. The macroblock 50 illustrated in FIG. 4 is selected to represent the last macroblock of a slice to better illustrate boundary pixel interpolation issues as described below. The data of the macroblock 50 in the incoming signal 12 is DCT encoded data, which is inverse transformed by the decompression and transformation section 21 of the video decoder 33 into spatial pixel data.

In the incoming signal 12, the video data may have been frame-DCT encoded or field-DCT encoded. If frame-DCT encoded, the data of the top and bottom fields will be found encoded together, and will be decoded together. If field-DCT encoded, the data of the top and bottom fields will be found encoded separately, and, accordingly, will be decoded separately. In either case, but more likely in a frame encoded case, the top and bottom fields could represent simultaneous image data or data that may be said to be closely correlated. In other cases, but more likely in the field encoded case, the fields represent successive data, each field of which is encoded at intervals $\frac{1}{2}$ of a frame, or $\frac{1}{60}$th of a second, for example, apart. In either case, the fields will ultimately be displayed successively at the $\frac{1}{2}$ frame intervals. Such differences are considered by the interpolator 22.

The present invention provides that all of the pixel data of lower resolution pictures that are input in the form of either a frame or separate fields are upsampled to preferably 2×N lines, for example from a 480 image of two interleaved 240 line fields to a 960 line progressive frame substitute for each field. Preferably also, the pictures are upsampled to twice as many pixels per line, for example, from 720 to 1440 pixels per line. The upsampling is achieved by interpolation of values for intervening pixels in the upsampling or interpolation section 22 of the video decoder 33 following the decompression and inverse DCT of the picture data. The interpolation may be carried out either on a frame basis or on a field basis, but is preferably carried out by the optimum interpolation method, frame or field, according to certain criteria described herein.

When interpolation is performed on a frame basis, hereafter referred to as frame interpolation, rows of pixels are interpolated, one between each adjacent pair of top and bottom field rows, from the pixel values of one even row and an adjacent odd row from the same frame picture. This results in one new interpolated row of vertical half-pel values between adjacent rows of the original frame picture. Additional columns are also preferably interpolated, one pixel between each adjacent pair of pixels of each row, from the pixel values of adjacent pixels in the respective even and odd rows, resulting in one new interpolated column representing horizontal half-pel values between adjacent columns of the original picture. With frame interpolation, all of the original pixel data occupy their corresponding positions in the upsampled picture, and all of the interpolated data are interpolated from the nearby original pixel data of either field, as illustrated in box 52 in FIG. 4, which represents an upsampled frame-interpolated macroblock in the on-chip memory 35 of the video decoder 33.

When interpolation is performed on a field basis, hereafter referred to as field interpolation, rows of pixels are interpolated between consecutive rows of the data of the macroblock, by averaging pixel values from only one field, not from both. Field interpolation is carried out by interpolating three rows of pixels between the consecutive top field rows from the pixel values of adjacent even rows of the top field and interpolating three rows of pixels between the consecutive bottom field rows from the pixel values of adjacent odd rows of the bottom field, as illustrated by the boxes 55 and 57 in FIG. 4, which represent upsampled field interpolated macroblocks in the on-chip memory 35 of the video decoder 33. The middle one of the three interpolated rows occupies the positions held by the data of the opposite field and the other two rows are new data that occupy half pel locations.

For example, in the top field case, the three rows include one interpolated row of pixel data representing an odd row between the consecutive even rows of the top field as well as two half-pel rows between the even row data and the interpolated odd row of data. The intervening odd row is interpolated from even row data in the top field because the data of the odd rows from the bottom field may be unreliable due to possible motion of the image in the half-frame or ⅟₆₀th second between the two frames of data. Columns of pixels between adjacent columns are interpolated from the values of adjacent pixels as in the case of frame interpolation. Similarly, the data of the bottom field is interpolated separately from only pixel values in the odd rows of the bottom field, in the same way as the top field data are interpolated from only data of the even rows in the top field. Using field interpolation, entire pictures of upsampled double resolution data are generated from data of each of the fields.

When the incoming video data are that of an I-picture or a P-picture, the upsampling is carried out to produce two full frame images, which are stored in separate full frame buffers. In the case of I-pictures, the data is stored directly, and in the case of P-pictures, the data, which is error block data, is added to data copied by motion compensation from a previously upsampled and stored reference picture. In FIG. 3, the two full frame buffers 43 and 44 are illustrated, one buffer 43 or 44 for each reference I-picture or P-picture. Each of these buffers includes a full frame storage area 43T, 44T for respectively storing a full upsampled frame for use in motion compensated copying to form the top field of a subsequent P-picture or subsequent B-pictures, and a full frame storage area 43B, 44B for respectively storing a full upsampled frame for use in motion compensated copying to form the bottom field of a subsequent P-picture or subsequent B-pictures.

Where field interpolation has been carried out, the data of a picture for each of the top and bottom frames will have been generated solely from respective top and bottom field data, so that the full frame data in the T and B storage areas of the buffer 43 or 44 can be different, accommodating for any motion in the half frame interval between the fields. When each top or bottom field of a subsequent P- or B-picture is reconstructed, data are copied from the respective T or B storage area of the buffer. Where frame interpolation has been carried out, each frame is interpolated from full frame data, so that, when each top or bottom field of a subsequent P- or B-picture is reconstructed, data are copied from the same full frame data. The preferred way to facilitate this in many cases is to make the contents of both areas T and B of storage areas 43,44 identical by storing a copy of the upsampled frame interpolated frame in each storage area of the reference picture buffer.

In FIG. 4, where frame interpolation has been carried out by the interpolator 22 on a received frame I-picture, on-chip memory 35 is written with data such as illustrated in area segment 52, with the original pixel data from the top field represented by solid dots $T_{x,y}$ and the original pixel data from the bottom field represented by solid dots $B_{x,y}$. Pixel data interpolated from data from both of these fields are represented by open dots 53. In this case of frame interpolated I-pictures, the same upsampled data of block 55 is written to both full frame T and B areas of one of the buffers 43 or 44.

The pixels of the bottom row of the macroblocks and rightmost column of the macroblock cannot be interpolated unless and until adjacent macroblock data are available. These pixels are represented by phantom dots 54. Therefore, after data of an entire frame are stored in one of the buffers 43 or 44, data may be, and preferably are, reread from these buffers and a second pass interpolation is performed, which reads data from the original data boundary rows of adjacent slices and interpolates the border rows of pixel data.

The stored frame interpolated data in the buffer 23 may be stored in one field area T or B of buffer 43 or 44, and logic provided to route the future copying from one of these field areas to both fields of a future picture. However, and preferably, such frame interpolated data as in segment 52 is duplicated into both top or bottom portions of the buffer 43,44, so that it will not be necessary to keep track of whether the previously stored data was frame interpolated or field interpolated. In the case of P-pictures where, except in special cases such as progressive frame pictures, motion compensation usually results in some differences between the data for certain pixels of the different fields, so the use of two reference buffers for the two fields is usually preferred and the provision therefor is generally desirable.

Also in FIG. 4, where field interpolation has been carried out on a received frame I-picture by the interpolator 22, the top field part T of one of the buffers 43 or 44 is written with original data from the even rows of the macroblock 50, such as illustrated in block 55 as solid dots $T_{x,y}$. Each intervening three rows of pixel data are interpolated only from this original top field data as represented by open dots 56 in the block 55. The bottom field parts B of the same one of buffers 43 or 44 are stored with original data from the odd rows of the macroblock 50, such as illustrated in block 57 by solid dots $B_{x,y}$, with the other intervening pixel data being data interpolated only from this original bottom field data as represented by open dots 58 in the block 57.

In the field interpolation case, the pixels of the two topmost rows and the bottom row of the macroblocks and the two leftmost columns of the first macroblock of a slice and the rightmost column of the last macroblock of a slice cannot be interpolated for bottom fields, while the pixels of the bottom three rows of the macroblocks and the three rightmost columns of the last macroblock of a slice cannot be interpolated for top fields, unless and until adjacent macroblock data are available. These border pixels are represented by phantom dots 59 in blocks 55 and 57. These values are interpolated when the second pass interpolation is performed.

In the case of P-pictures, their error blocks are upsampled and stored into reference picture buffers 43 and 44 in the same way as described for I-pictures above in connection with FIG. 4, with the exception that the pixel data in the block 52, if the upsampling is done by frame interpolation, or 55 and 57, if the upsampling is done by field interpolation, are the subjected to motion compensation, by the addition of data copied from a reference picture to each of the error block pels, before storage in the reference picture buffers 43 and 44. Since the data in the reference picture buffers 43 and 44 from which data would be copied includes pixel data in the half pel positions, the motion compensation vectors can copy the data directly without the need to perform further interpolation of half pel values should half pel vectors values be present. The half pel copying is carried out at least for all new pels of the target block, with the exception that, in the preferred embodiment, pels in original data positions are instead re-interpolated according to MPEG techniques from only MPEG original pel position data from the reference picture. This is described in further detail below.

In the case of B-pictures, the interpolation of error block data is performed as in the case of I- and P-pictures described above, but the upsampled data are not written to frame buffers 43,44 but rather may be written directly to output buffer 34 after being combined with data copied from one or both reference pictures by motion compensation. The data from the output buffer are output one field at a time, with data of the top field and the bottom field being output alternately. With B-pictures, the interpolation is carried out in the same manner as for I-pictures and P-pictures as described above.

While in the case of I-pictures, pixel data of all of the macroblocks of the picture are encoded in the incoming signal and all are interpolated and stored in the frame buffer 43, in the case of P-pictures and B-pictures, each macroblock is defined by motion vectors encoded in the incoming signal that identify macroblock-sized areas of a previously stored I-picture or P-picture in a frame buffers 43 and 44 from which pixel data are to be copied to complete the P-picture or B-picture being received. In the case of P-pictures, which are predictive pictures that copy from only one frame, one motion vector per macroblock or per each field of the macroblock is included, which specifies the area of a single one of the frame buffers to be copied. With B-pictures, which may be interpolated from one or two frame pictures, two motion vectors per macroblock or per each field of a macroblock are included, which identify areas of the frame buffers 43,44 to be averaged and copied.

In the case of P-pictures, the copied data that has been upsampled by interpolator 22 and stored as explained in connection with FIG. 4 is read from the appropriate one of the frame buffers 43,44 from an area determined by the motion compensation section 24 of the video decoder 33 based on the interpretation of a decoded motion vector, and then combined with the upsampled error block data and written to the frame buffer 43,44 that is opposite the one from which the data are copied. In the case of B-pictures, the data are copied, usually from two areas of two different frame buffers 43,44 as determined by the motion compensation section 34 from the motion vector data, and then combined with the upsampled error block data and written to output buffer 34. In the case of P-pictures and B-pictures, each macroblock can include motion vector data in addition to the error block of pixel data that is not accurately defined by the data copied pursuant to the motion vector. The copied data has been previously upsampled. Only the error block data of the new picture needs to be further upsampled.

In the processing of the motion vector compensated data for the new P-pictures and B-pictures, the relocation of the copied data are determined by the motion compensation section 24 to the nearest original half-pel in response to motion vectors that specify copying from locations halfway between pels of the original frame or field. Since all of the incoming picture data are upsampled immediately after decoding and prior to storage to any buffer, further half-pel interpolation is not necessary at the time the motion vectors are processed by the motion compensation section 24 of the video decoder 33. While such further half pel interpolation need not be employed for the copying of data to any pel of the new picture, in the preferred embodiment, such further interpolation is avoided in the case of each of the new pixel positions that exist as a result of the upsampling. For those pixels that occupy locations that correspond to original integer positions of pixels of the original picture, it is preferred that the pixels be re-interpolated according to MPEG by averaging data only from similarly corresponding original pixel locations of the reference picture or pictures.

In performing the upsampling or half-pel interpolations by the interpolator 22, it is possible to predetermine that either full frame interpolation or field interpolation will always be used. In such a case, it is generally preferably that all interpolation be done in the form of field interpolation, since this will be appropriate in more cases than frame interpolation for the viewing of typical video programs. However, it is more preferable for the interpolator to analyze the incoming signal for information that will lead to a determination that either frame interpolation is more appropriate or field interpolation is more appropriate for a given program, picture sequence, picture or macroblock of a picture. As a general rule, when there is close temporal correlation between the two fields of a picture, that is, when little or no motion has occurred in a picture between its top field data and its bottom field data, frame interpolation is more likely to yield a more accurate interpolation of the pixels being created by upsampling than will field interpolation. On the other hand, where there is low correlation, or where the motion is great, between the field data, then field interpolation is more likely to yield more accurate interpolation. Information is contained in the incoming signal which enables the interpolator 22 to determine the interpolation method that is more likely to more accurately interpolate the intervening pixels.

One form of video input signal involves the encoding of pictures by progressive frame encoding. With progressive frame encoding, both fields of a frame picture contain data recorded simultaneously, the interleaved lines of which are progressively scanned and DCT encoded, and not separately grouped into even-line and odd-line fields for DCT encoding. Progressive frame encoding may be found in the case of programs that originate as motion picture films, which are recorded photographically on film transparencies. Such motion picture films are typically photographed at 24 full frames per second. In digitizing such frame images, two fields may be scanned from the same film image, whereby both fields represent portions of an image recorded at the same time. In the encoding process, these frames are converted into MPEG video bitstreams of 30 frames (60 fields) per second by a frame rate conversion method that is referred to as the 3:2 pull-down method.

With the 3:2 pull-down method, a first one of the 24 (per second) film frames is scanned and digitized as three consecutive fields of identical images, one top field, one bottom field, and one top field. These are intended to be displayed at ⅟₆₀th second intervals on the presentation device of a decoder. Then a second one of the 24 film frames two frames is scanned and digitized s two consecutive fields of identical images, one bottom field then one top field. Then the third film frame is scanned as three fields: bottom-top-bottom; then the fourth film frame is scanned as two fields: top-bottom; and so forth. The result is a conversion of 24 photographic frames per second to 60 alternating field pictures per second. The fact that an incoming program is encoded as progressive frames is contained in information in certain headers in the incoming signal. When such information is detected, indicating that the data are encoded as progressive frames, frame interpolation by the interpolator 22 is more accurate, and preferred.

A second form of the incoming program is the frame-DCT, zero motion vector situation. This form of program is produced by the DCT encoding of pictures by frame, with the lines interleaved, rather than by field, with the top field lines and bottom field lines grouped separately. As a result, the inverse transformation performed by the decoder 21 of the receiver produces an interleaved frame picture. With the two fields coded together as interleaved frames, the two fields do not necessarily contain data recorded simultaneously. The data of the odd lines or bottom field might be data recorded ½frame, or ⅟₆₀th of a second, later than the data of the previously recorded even lines or top field. If, however, no motion occurred in the time interval between fields, then the question of whether or not the fields correlate in time is not likely to be relevant. This is the case where, usually with P-pictures, but also possibly with B-pictures, the motion vector is zero. This frame-DCT zero-motion-vector situation can be detected by the video decoder 33 directly from the frame-DCT field in the picture header and from the motion vector values in the decoded data. When this situation is detected, it is likely that the fields will be closely correlated, since there has been no motion between frames. In such a case, frame interpolation by the interpolator 22 is more likely to be more accurate than field interpolation, and therefore, frame interpolation in this situation is preferred. In the case of I-pictures, which have no motions vector themselves, when not encoded as progressive frame pictures they can instead fall into this category, that is, the category in which it cannot be assumed that the fields were encoded either simultaneously or successively. With I-pictures, the decoder can look for zero motion vectors in adjacent B-frames to determine if motion is likely to have occurred between fields of the I-picture.

A third situation is where there is frame DCT and frame motion compensation, that is, where the interleaved lines of pixel data are DCT encoded together and where the same motion vectors are applicable to both fields of the frame. Such pictures can be interpolated on a frame basis, which provides better interpolation where motion is low, or on a field by field basis, which provides better interpolation where motion is high. In this situation, it is preferred that the energy of the error blocks be used to determine the amount of motion. The energy of the error blocks refers to the amount of individual pixel correction data required to correct the data of the macroblock after the motion compensation is calculated. A large amount of error block data, or high error energy, is interpreted to suggest that the amount of motion is probably high and that the correlation between fields is correspondingly low. A small amount of error block data, or low error energy, is interpreted to suggest that the amount of motion is probably low and that the correlation between fields is correspondingly high. Accordingly, when, in the case of frame-DCT and frame motion compensation, error energy is low, frame interpolation is preferably employed, while when error energy is high, field interpolation is preferably employed.

A fourth situation is where there is frame DCT but motion compensation is by field, that is, where the interleaved lines of pixel data are DCT encoded together and where the different motion vectors are applicable to each of the fields of the frame. In this case it is more likely than in the third case that interpolation by field is better, and preferably, field interpolation is always used in this case. Alternatively, such pictures can be interpolated on a frame basis where the energy of the error blocks is very low.

A fifth situation is that known as Dual Prime, in which a single motion vector and a differential motion vector per macroblock are transmitted for both fields. Usually, frame DCT data are received. This form of coding is indicated where there is substantial motion, but the motion is constant. The fields of data in the frame will not be simultaneous and there will be substantial motion between the frames, but the motion will be constant or nearly constant. In such a situation, field interpolation is presumed likely to be better and is preferred.

In a sixth situation, the data are field-DCT encoded. Regardless of the size of the motion vectors or the error block energy, it is presumed that the fields are not simultaneous, and therefore field interpolation is preferred.

In the seventh situation, the received picture is a field picture, such as a B-picture. In this situation, field interpolation is used. This is typical of B-pictures.

In all of the above situations, the provision of the present invention that upsampling of the data occur after the decoding but prior to the buffering of the incoming data, interpolating half-pel data in every case, produces high resolution output from lower resolution incoming data.

The performance of motion compensation by copying the upsampled data from the frame buffer 23 can be carried out in a number of ways. In the most straight-forward way, the motion vector coordinates are simply multiplied by 2, eliminating any need for half-pel interpolation, and copying data directly from the reference buffers to a target macroblock. Such a method is preferred, at least for pixel data at positions that are created as a result of the upsampling. Such a method is not always preferred, however, as can be demonstrated by reference to FIG. 5.

Figure 5:
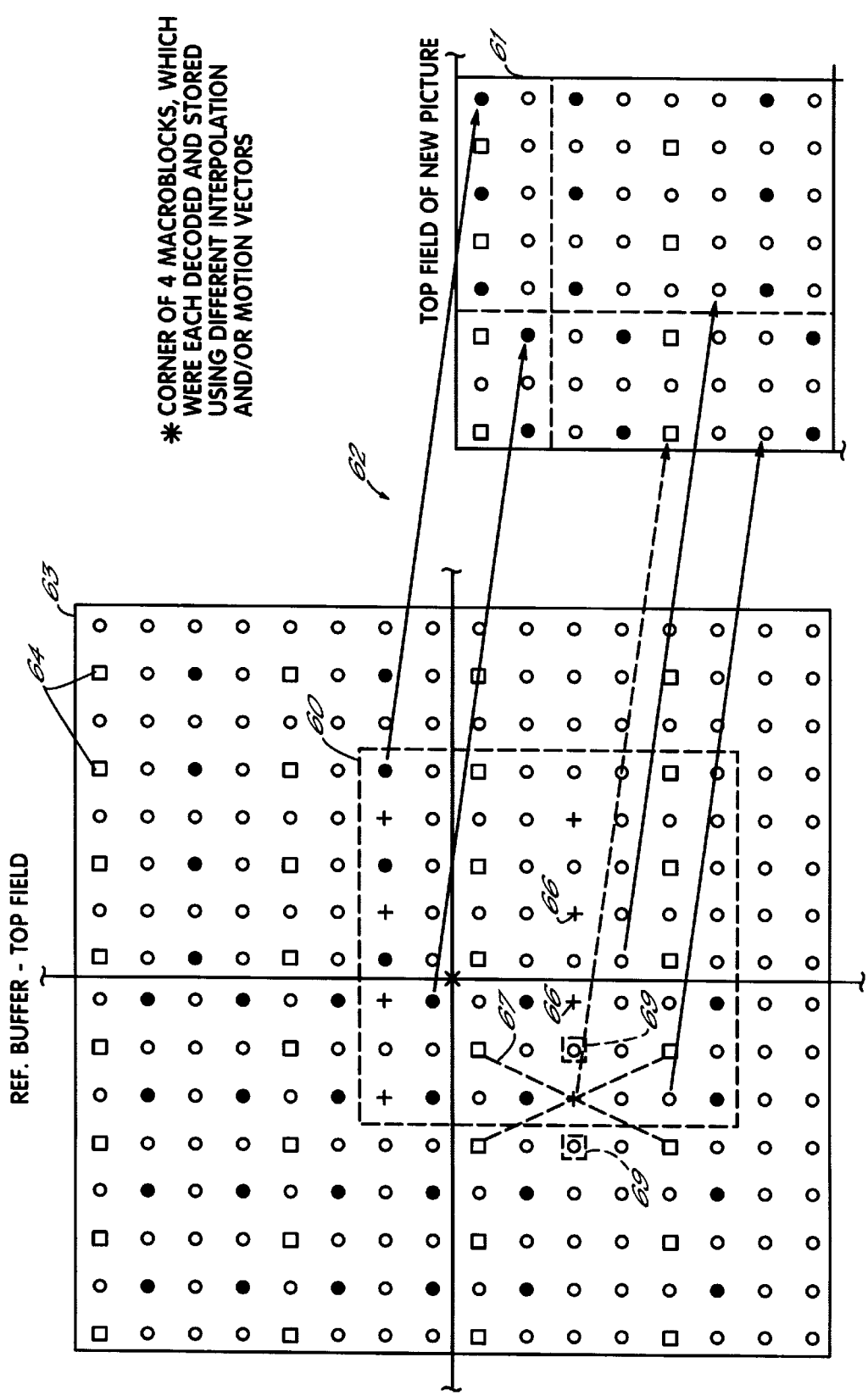
FIG. 5 is a simplified diagrammatic representation of one example of half-pel motion compensation with a field motion vector to construct a top field of target picture from a top field reference frame buffer containing macroblocks that were upsampled by frame and field interpolation.

In FIG. 5 is illustrated a macroblock-size area 60 of a reference buffer 43T or 44T determined by field based motion vector 62 having values of –½,–1½ for copying data to a target macroblock 61. In the frame case, the motion vector would have a value of –1 in the vertical direction. Intermediate vertical vector lengths amount to half pel vertical distances for frame motion vectors, but such vectors are illegal for field motion vectors as they would require quarter pel interpolation. In FIG. 5, the 8×8 blocks on the left represent the adjacent corners of four macroblocks in the reference buffer, while the 8×8 square at the right represents a portion of a target macroblock to which data is being copied. In the figure, solid dots represent hypothetical patterns of pixels that contain original data, while the open dots represent pixels having data that is the result of interpolation as explained above by averaging data from two or three immediately adjacent pixels. As the figure demonstrates, because each macroblock of a picture can be either frame or field interpolated, and may have been stored as a result of copied motion vector data, the pattern of original data cannot be assumed. In the figure, a 2×2 square 63 of four macroblocks having pixel data generated in four different ways is shown. The area 61 overlaps onto the four macroblocks of the square 63.

Also in FIG. 5 the pixels 64 that are located at positions that correspond to original pixel positions in the original picture as it existed before upsampling was carried out are designated by square dots rather than circular dots. In that the buffer 43T/44T is a top field reference picture buffer, the pixels 64 are located at alternating positions beginning at the left of the macroblocks in the first and fourth rows of the macroblocks. Similarly, in the target macroblock 61, pixels 65 are shown as square pixels representing the positions that existed prior to the upsampling. Preferably these pixel data are re-interpolated to produce the same results that would have been produced had standard MPEG motion compensation been performed to generate these pixels absent the upsampling. In the case of the field motion vectors illustrated, this is achieved by, instead of copying data from the pixels 66, designated by a "+", as specified by the dotted ones of motion vectors 62, performing MPEG half pel interpolation from the nearby ones of the pixels 64 identified in accordance with the pattern shown by broken lines 67. Where frame motion compensation is being carried out, the same motion vectors would be whole pel vectors in the vertical direction, and the interpolation would average data from two pixels 69, shown as enclosed in broken squares, from bottom field buffer 43B/44B. The data for the original position pixels 64 is either original data from original pixels or will have been similarly half pel interpolated according to MPEG standards from original pixel data. As a result, the upsampled pictures contain pixel data in the original pixel positions that make up the standard resolution picture reproduced according to MPEG. If desired, by filtering all but the pixels in the original positions, the pictures can be presented in standard resolution in exactly the same manner as they would be reproduced by a standard resolution MPEG receiver.

The above generation of data for all pixels is carried out by copying data from the top field reference buffers 43T,44T in response to top field motion vectors and from bottom field reference buffers 43B,44B in response to bottom field motion vectors. (A top field motion vector is one that calls for copying from a top field of a reference picture even though a target picture bottom field is being constructed, and vice versa.) In cases where frame motion vectors are provided, the process is divided so that top fields of a target picture are generated by application of the motion vector to the top field reference buffer and bottom fields of a target picture are generated by application of the motion vector to the bottom field reference buffer. In the field case, the motion vectors can specify that the data be copied from the opposite field of a frame.

The motion compensation for B-pictures is typically performed by copying data from two frame pictures in each of the reference picture buffers 43 and 44 and averaging the copied values. In the figures described above, only one vector is illustrated for simplicity. In the actual situation, the averaging can result in the averaging, from different frames, of values from two original pixels, from two interpolated pixels, or from one original and one interpolated pixel.

Those skilled in the art will appreciate that the applications of the present invention herein are varied, and that the invention is described in preferred embodiments. Accordingly, additions and modifications can be made without departing from the principles of the invention.

What is claimed is:

1. A method of decoding an MPEG video signal for display at a higher resolution than that at which the video stream was encoded, wherein the video stream includes a series of video pictures, the method comprising the steps of:

decoding from an MPEG video signal a video picture coded by spacial-transform encoded blocks of digital pixel data at original pixel positions at an initial resolution to produce a decoded picture formed of an array of the digital pixel data at the original pixel positions at the initial resolution;

upsampling, to a resolution higher than the initial resolution, the digital pixel data from the decoded video signal by interpolating additional pixels of data at additional positions between the original pixel positions of the decoded video signal to produce an upsampled video picture at the higher resolution;

storing as an MPEG reference picture in a buffer memory the upsampled video picture at the higher resolution; and producing a motion compensated MPEG video picture at the higher resolution by copying interpolated additional pixels of data from the additional positions of the stored reference picture.

2. The method of claim 1 wherein:

the motion compensated picture producing step includes performing half-pel motion compensation by directly copying data from pixel positions of the stored reference picture to additional positions between original pixel positions of motion compensated picture.

3. The method of claim 2 wherein:

the half-pel motion compensation performing step directly copying data from original pixel positions of the reference picture to pixel positions in the motion compensated picture and directly copying interpolated pixel data from other positions in the reference picture to other pixel locations in the motion compensated picture.

4. The method of claim 3 wherein:

the motion compensated picture producing step includes performing half-pel motion compensation of data for pixels at original pixel positions of the motion compensated picture by interpolating data only from original pixel positions of the reference picture.

5. The method of claim 1 wherein:

the motion compensated picture producing step includes producing data for pixels at original pixel positions of the motion compensated picture only from data from original pixel positions of the reference picture.

6. The method of claim 1 wherein:

the upsampling step includes the step of producing two high resolution field interpolated frame pictures, one from pixel data of one field of the video picture and the other from pixel data of the other field of the video picture; and the storing step includes the step of storing in two respective areas of the buffer memory the two high resolution field interpolated frame-pictures.

7. The method of claim 1 wherein:

the motion compensated picture producing step includes the step of copying the data to a new picture that is a high resolution frame picture; and the method further comprises the step of storing in the buffer memory data of the new high resolution frame-picture.

8. The method of claim 1 wherein:

the motion compensated picture producing step includes the step of copying the data to a new picture that is a high resolution field picture; and the method further comprises the step outputting to the video display the new high resolution field-picture.

9. The method of claim 1 wherein:

the upsampling step includes the step of interpolating at least one row of pixels between pairs of rows of the decoded video signal.

10. A digital video decoder programmed to perform the method of claim 1.

11. The method of claim 9 wherein:

the upsampling step includes the frame interpolation step of interpolating a row of pixels from and between adjacent rows of the decoded video signal.

12. The method of claim 9 wherein:

the upsampling step includes the field interpolation step of interpolating three rows of pixels from and between adjacent alternate rows of the decoded video signal.

13. The method of claim 9 wherein:

the upsampling step includes field interpolation steps of interpolating three rows of pixels from and between adjacent even rows of the decoded video signal and interpolating three rows of pixels from and between adjacent odd rows of the decoded video signal.

14. The method of claim 1 wherein:

the upsampling step includes the step of performing selectively, in response to information derived from the MPEG video signal, interpolation selected from the group consisting of frame interpolation and field interpolation.

15. The method of claim 14 further comprising the steps of:

determining from the MPEG video signal whether the MPEG video signal contains progressive frame pictures and, if the MPEG video signal contains progressive frame pictures, in response to the determination thereof, performing the upsampling step by frame interpolation.

16. The method of claim 14 further comprising the steps of:

determining from the MPEG video signal whether the MPEG video signal contains pictures encoded with the lines grouped by field, and, if the MPEG video signal contains pictures encoded with the lines grouped by field, in response to the determination thereof, performing the upsampling step by field interpolation.

17. The method of claim 16 wherein:

the determining step includes the step of determining whether the MPEG video signal contains field pictures, and, in response to the determination, performing the upsampling step by field interpolation.

18. The method of claim 14 further comprising the steps of:

determining from the MPEG video signal whether the MPEG video signal contains pictures encoded by frame with odd and even lines of respective top and bottom fields interleaved, and, if the MPEG video signal contains pictures so encoded by frame, further considering information from the MPEG video signal of the motion associated with pictures being decoded, and, in response to the determination and the information, performing selectively interpolation selected from the group consisting of frame interpolation and field interpolation.

19. The method of claim 18 wherein:

the considering step includes the step of considering a level of error block energy in the picture being decoded and, performing the upsampling step by field interpolation if the level of energy considered is relatively high and by frame interpolation if the energy being considered is relatively low.

20. The method of claim 18 wherein:

the determining step also includes the step of further determining whether the picture being decoded contains data that is motion compensated by frame; and in response to the further determination that the picture being decoded contains data that is motion compensated by frame, performing the considering step by considering a level of error block energy in the picture being decoded and, performing the upsampling step by field interpolation if the level of energy considered is relatively high and by frame interpolation if the energy being considered is relatively low.

21. The method of claim 18 wherein:

the considering step includes the step of considering whether motion compensation is substantially zero and, performing the upsampling step by frame interpolation if the motion compensation is substantially zero.

22. The method of claim 18 wherein:

the determining step also includes the step of further determining whether the picture being decoded contains data that is motion compensated by field; and in response to the further determination that the picture being decoded contains data that is motion compensated by field, performing the upsampling step by field interpolation.

23. The method of claim 18 wherein:

the determining step also includes the step of further determining whether the picture being decoded contains data that is motion compensated by dual prim motion compensation; and in response to the further determination that the picture being decoded contains data that is motion compensated by dual prime motion compensation, performing the upsampling step by field interpolation.

24. A digital video decoder programmed to perform the method of claim 14.

* * * * *

UNITED STATES PATENT AND TRADEMARK OFFICE
CERTIFICATE OF CORRECTION

PATENT NO.   : 6,295,089 B1
DATED        : September 25, 2001
INVENTOR(S)  : Dzung Hoang It is certified that error appears in the above-identified patent and that said Letters Patent is hereby corrected as shown below:

<u>Title page, Item [54] and Column 1, line 1,</u>
Title reads "UNSAMPLED" and should read -- UPSAMPLED --.

<u>Drawings,</u>
FIG.3 reads "CONYROLLER" and should read -- CONTROLLER --.

<u>Column 3,</u>
Line 32, reads "the the increasing" and should read -- the increasing --.

<u>Column 5,</u>
Line 2, reads "data from data from" and should read -- data from --.
Line 4, reads "this pixel data are" and should read -- these pixel data are --.
Line 10, reads "portion a frame" and should read -- portion of a frame --.

<u>Column 10,</u>
Line 26, end of sentence reads "block size)." and should read -- block size.) --.

<u>Column 13,</u>
Line 30, reads "are the subjected to" and should read -- are then subjected to --.

<u>Column 14,</u>
Line 25, reads "copied data are determined by" and should read -- copied data is determinded by --.

<u>Column 15,</u>
Line 23, reads "digitized s two" and should read -- digitized as two --.
Line 61, reads "motions vector" and should read -- motion vector --.

<u>Column 18,</u>
Line 50, reads "the half-pel motion compensation performing step directly copying" and should read -- the half-pel motion compensation performing step includes directly copying --.

UNITED STATES PATENT AND TRADEMARK OFFICE
CERTIFICATE OF CORRECTION

PATENT NO.    : 6,295,089 B1
DATED         : September 25, 2001
INVENTOR(S)   : Dzung Hoang It is certified that error appears in the above-identified patent and that said Letters Patent is hereby corrected as shown below:

Column 20,
Line 57, reads "prim" and should read -- prime --.

Signed and Sealed this

Twenty-seventh Day of August, 2002

Attest:

JAMES E. ROGAN
Attesting Officer        Director of the United States Patent and Trademark Office